Patented Apr. 21, 1953

2,636,017

UNITED STATES PATENT OFFICE 2,636,017

BODIED PHENOLIC VARNISH AND PROCESS

Hyman Schwartzberg, Chicago, Ill., assignor to The Glidden Company, Cleveland, Ohio, a corporation of Ohio No Drawing. Application November 29, 1946, Serial No. 713,070

6 Claims. (Cl. 260—33.4)

This invention relates to novel protective coatings and to processes for preparing them.

It has long been known that phenolic polyalcohols can be prepared by condensing phenol or alkylated phenol derivatives having three reactive positions, with an excess of formaldehyde. Such polyalcohols of phenol for example may consist entirely or predominantly (depending on the details of the process which is used) of trimethylol phenols, or mixtures thereof with lower polyalcohols, and may be condensed in such manner that little if any resin is formed as a result of polymerization or resinification of these alcohols. Such polyalcohols have only been polymerized in the past to provide molding resins so far as I am aware. I have now discovered, however that such phenolic alcohols can be produced in a thin, syrupy state and when bodied thermally in a solvent may be thereafter applied as a coating and cured to an insoluble state.

It accordingly is an object of this invention to provide such novel coating compositions.

A further object is to provide new processes for preparing such coating compositions.

These and other objects will be apparent from the following description of the invention.

Various methods may be used to bring about the condensation of phenol or phenolic derivatives with an excess of formaldehyde in a basic medium to produce polyalcohols, but I have found that if the condensation is moderated by avoiding temperatures above about 100° F. during the period of the reaction, then the polyalcohols may be formed almost to the exclusion of resinified products of the polyalcohols. As a result, a solution is obtained which is of uniform characteristics and which may be treated subsequently under controlled conditions to produce a uniform potentially heat-reactive syrup which may be modified by thermal treatments thereafter to provide coating compositions curable to form the insoluble coating compositions mentioned above.

In accordance with a preferred manner of preparing the condensation products, phenol is reacted in aqueous solution with about 2¼ to 3½ mols of formaldehyde per mol of phenol, in the presence of a small amount of a strong base, such as sodium hydroxide or monomethylamine. The strong base is present preferably in amounts of from about .05 to 0.1 mol per mol of phenol, but larger amounts up to about equimolar proportions may be used. The base is completely dissolved in the phenol before the formaldehyde is introduced. The formaldehyde may be introduced in the form of the usual aqueous solution containing about 37% formaldehyde by weight. After mixing the reactants thoroughly, the mixture is allowed to stand at room temperature for a period of 7 days, more or less, depending on the ambient temperature. Agitation or stirring during this period may be used but is not necessary. For temperatures around 70° to 80° F., an aging period of a week is suitable, but for higher ambient temperatures up to about 100° F. 5 days is adequate. This aging period is an important part of the process since by means of it and the stated proportions of the reactants, the formation of polymethylol phenols is favored. After the aging period has elapsed the reaction mixture is placed in a jacketed vacuum kettle and heated with agitation, but without vacuum, to between 130° F. to 150° F. immediately after which its alkalinity is neutralized and its pH is adjusted to about 6 by the addition of an acid. This heating step is employed merely to facilitate a prompt neutralization, and prolonged heating without neutralization, or beyond that needed to obtain prompt neutralization should be avoided. Either organic or inorganic acids may be used for neutralization of the base and adjustment of the pH, but some acids are more suitable than others. I prefer to use hydrochloric, phosphoric, oxalic or fumaric, and particularly prefer oxalic acid. Sulfuric acid or nitric acid may be used, but either is apt to produce syrups of darker color after neutralization has been effected and to adversely affect the permanency of the finished coating. The acidified mixture is promptly cooled by circulating water through the jacket of the kettle. Prompt cooling should be employed to avoid the rapid and uncontrolled polymerization which may occur at these higher temperatures after neutralization has been effected. The mixture is next inspissated under vacuum until substantially dehydrated. Preferably at least about 93% to 97% of the water should be removed. During this inspissation the temperatures and pressures may range from about 90° F. to 120° F., and from about 10 mm. to 75 mm. respectively. After the water has been removed to the desired extent, the resulting dehydrated syrup is preferably filtered to remove the salts formed by neutralization, and to remove any other solid matter. The syrup is then ready for use in preparing coating compositions, as explained hereinafter.

Numerous variations may be made in the foregoing preferred method, to produce syrups of somewhat similar properties. In place of phenol, alkylated phenols having three reactive positions in their monocyclic structure available to aldehydes may be used. Meta cresol and 3,5 xylenol are examples. Moreover, these alkylated phenols may be used in admixture with each other or with phenol in any desired proportions to produce modifications in the properties of the resulting syrups. However, I prefer to use not substantially more than about 5% of the alkylated phenols in combination with phenol in order to retain good solvent resistance in the finished coatings.

Phenol, production mixtures of phenols composed predominantly of phenol or mixtures of phenol with up to 5% of the alkylated phenols are preferred, since coating compositions prepared from these syrups can be suitably cured to produce highly flexible insoluble films which exhibit great resistance to ultra-violet light.

Instead of aqueous formaldehyde, paraformaldehyde may be employed. Also, various other aliphatic aldehydes may be used in place of or in combination with formaldehyde. Thus, acetaldehyde and other aliphatic aldehydes of greater chain length up to 5 carbons may be employed.

Molar ratios of aldehyde to phenols greater than 3½ to 1 may also be used to advantage to increase the rate of reaction and thereby to reduce the indicated aging or standing periods within the temperature ranges indicated above. However, the excess aldehyde over about 3 to 1 ratio has no other observed effect on the resulting syrup, and is of course removed during the vacuum inspissation so that it is absent from the finished syrup.

The aging or standing period may vary considerably from about three days to about ten days, depending on the phenolic material employed. Phenol requires a longer reaction time, for instance, than meta cresol which may react completely with the formaldehyde at room temperatures in a matter of four days. However, I prefer to allow at least a 5-day aging period to ensure complete reaction even when the faster phenol derivatives are used.

The syrups produced in the above manners are water soluble, form stable water solutions and are potentially heat reactive. That is, films of the syrups may be subjected to heat to effect a curing which converts the film to an insoluble state. However, unless the syrups are further modified as hereinafter described, the cured films are not particularly satisfactory as protective coatings because of their tendency to exhibit pinholes.

I have found that the syrups may be bodied thermally in the presence of a solvent and an acid catalyst to produce varnishes of useful coating properties, especially when the syrups are made from phenol, commercial phenol, or mixtures of phenol with up to about 5% of the alkylated phenols. The bodying process is preferably carried out in the presence of a compatible, volatile solvent such as glycolmonoethylether, glycol monoacetate, ketones, ethanol, butanol, amyl alcohol, and butyl or amyl acetates, and in the presence of an acid catalyst at a pH of between about 5 and 6. The acid catalyst may be either a mineral acid or an organic acid of the kinds employed in the inspissation. Here as there, sulfuric and nitric acids may be used, but should preferably be avoided because of their adverse effect on the long-term properties of the films.

The following example will illustrate the general type of procedure which I prefer to employ:

To 1000 pounds of the substantially dehydrated phenol-formaldehyde syrups as produced by the above preferred method, supra, was added 40 gallons of butanol and the resulting solution was heated with good agitation in fractionating apparatus equipped with a distillate receiver. When the batch temperature reached 130° F. to 150° F., thirty pounds of oxalic acid were added. Heating was continued until a temperature of about 210° F. had been reached, and a mixture of butanol and water had started to distill over. Samples of the batch were then taken periodically and checked for viscosity. When a viscosity of about Z on the Gardner-Holdt scale had been attained, an addition of 20 gallons of butanol was made and distillation was continued. Thereafter, whenever the viscosity of the batch reached a value of between X and Z, further additions of butanol were made in 20 gallon aliquots until a total of 120 gallons had been added to the original syrup. After the last addition had been made, heating was continued until the viscosity had again returned to a value of between X and Z, whereupon an addition of 25 gallons of glycol monoacetate was made. The batch was then cooled with continued agitation to about 130° F. and an addition of 102 gallons of ethanol was made. The batch was then cooled with agitation to room temperature. During this procedure, 25 gallons of water and 32 gallons of butanol had been collected in the receiver. The butanol so collected was recovered and retained for use in a subsequent batch.

A procedure of the foregoing type has been found to be very successful from the standpoint of securing efficient bodying of the syrup, but it does not necessarily have to be adhered to. If the syrup is thinned originally with a greater proportion of butanol, a longer time is required to obtain a suitable viscosity. Likewise, if larger aliquot portions are added, the rate of bodying is also decreased. On the contrary, if the syrup is initially thinned with less butanol and the aliquot portions are smaller, the rate of bodying may be increased considerably, but there is also the attendant risk of having the batch gel unexpectedly. The above procedure provides a commercial compromise which substantially avoids the risk of gelling while maintaining a commercially feasible rate of bodying. If bodying were attempted without the presence of solvent, the syrup would be very apt to gel promptly. For best results, not less than about 20 gallons (135 pounds) of butanol nor more than about 45 gallons (305 pounds) should be added per 1000 lbs. of syrup before bodying is started, while about 40 gallons (270 pounds) is preferred.

The properties of batches of bodied phenol-formaldehyde varnish made as indicated above have been found to be approximately as follows:

| | |
|---|---|
| Non-volatile matter | 31.6% to 34.6% |
| Acid number | 25.8 to 29.9 |
| Viscosity (Gardner-Holdt) | A-D |
| Weight per gallon | 8.07 to 8.17 lbs. |
| Color (Hellige Comparator) | 4 to 5 |

Such varnishes will cure rapidly at slightly elevated temperatures in comparison with known phenolic varnishes, particularly when an acid accelerator is added, and therefore, are of particular advantage over the presently known phenolic compositions. For example, the bodied and unplasticized varnishes made as above described when incorporating from 6% to 10% of an acid accelerator such as methyl phosphoric acid, form stable solutions which can be retained in a stable condition for many months at room temperatures, but which can be applied as coatings and then cured at low baking temperatures to form hard, flexible, insoluble films. The curing can be effected in from two to three minutes at 250° F., in from five to ten minutes at 180° F., and in from one to two hours at 140° F. They will also cure dry, (non-tacky) at room temperature in two to four hours, but do not attain full hardness and insolubility in acetone and alcohol until considerably longer time has elapsed. The bodied varnishes, before curing, are soluble in alcohols, ketones, ester-type solvents. In conjunction with the before mentioned solvents, the bodied varnish will tolerate some aliphatic type solvents and also some aromatic solvents such as solvent naphtha. On being cured, the accelerated varnish films become insoluble in acetone and alcohols and exhibit excellent resistance to darkening or yellowing by ultra-violet light. The cured varnish films also show excellent flexibility and hardness, and exhibit good adhesion to wood, aluminum, iron, other metals, and plated metals. The films will not support combustion, and merely char without flaming when exposed to intense heat or flame. They have excellent sanding and rubbing properties and exhibit good adhesion between coats, and good hot and cold checking resistance.

Other accelerators may be used, such as p-toluene sulfonic acid, phosphoric acid, dimethyl acid pyrophosphate, and alkyl esters of phosphoric acid other than the methyl ester named in the preceding paragraph. However, I particularly prefer to use methyl phosphoric acid with the phenol-formaldehyde varnishes made in accordance with the invention.

The bodied varnishes may be pigmented to make enamels, primers and wood-fillers, but since the varnish is of acid reaction, the pigments or organic dyes used in it should be selected so as to be unreactive with the acid varnish. For enamels, up to thirty or forty percent of unreactive pigment may be incorporated, while for primers, from 40% to 60% pigment by weight of the resin may be used.

The varnishes are compatible with a variety of plasticizers which may be added to them to modify their properties, where desired. The following plasticizers are among those which have been found to be compatible: dibutyl phthalate, tricresyl phosphate, methyl ester of rosin, methyl ester of hydrogenated rosin; 4-4' isopropylidene bis phenoxypropanol, urea and melamine resins, camphor, nitrocellulose, polyvinyl butyral resins, ethylene glycol, ethylene polyglycols, some alkyds, polystyrene resins, methyl methacrylate polymers, aryl sulfonamide-formaldehyde resins, and others. The melamine resins are of particular value, since their presence in amounts up to about 10% further increases the resistance of the varnishes to ultra-violet light, and I have found that instead of darkening in ultra-violet light, my phenol-formaldehyde varnishes which include melamine resins and are accelerated with methyl phosphoric acid actually become lighter in color.

The bodying procedure described above should be recognized to be merely one example of a suitable procedure. Many variations may be made, as pointed out above, and many others will be obvious to those skilled in the art. I contemplate as the essential step of all such procedures, the step of bodying or resinifying the syrups under mildly acid conditions in the presence of a compatible, volatile solvent while dehydrating the solution azeotropically. Preferably this bodying step is performed at temperatures below about 212° F. in a water insoluble solvent (to facilitate recovery of the solvent), at viscosities below about Z on the Gardner-Holdt scale and at a pH of 5 to 6. The bodying may of course be carried out to any desired extent short of that which causes gelling of the solution. I have found that the procedure described above effects a satisfactory degree of bodying and dehydration for most purposes, but it is apparent that lesser or greater degrees of bodying and/or dehydration could be effected without departing from the principles of this invention.

Having described my invention, what I claim is:

1. The method of preparing a coating composition which comprises the steps of: providing a potentially heat-reactive and substantially dehydrated syrup composed essentially of substantially unpolymerized polymethylol compounds of phenolic materials selected from the class consisting of phenol, meta cresol, 3,5 xylenol and mixtures thereof, said polymethylol compounds having a total combined formaldehyde content of between about 2¼ and 3 mols per mol of phenolic material; adding a volatile compatible organic solvent, and an acid catalyst to said syrup to establish a pH of 5 to 6; azeotropically distilling solvent and water from said mass while adding sufficient solvent to the distilling mass to maintain its viscosity below about Z, and so continuing the azeotropic distillation and separation of water until the mass attains a viscosity between A and D, inclusive, when measured therein at a non-volatile-matter level of between 31.6% and 34.6%, inclusive, thereby converting said syrup into a bodied, potentially heat-reactive film-forming material; and adding to the bodied material from 6% to 10% by weight thereof, of an acid accelerator.

2. A coating composition prepared in accordance with claim 1.

3. The method of preparing a coating composition which comprises the steps of: providing a potentially heat-reactive and substantially dehydrated syrup composed of substantially unpolymerized polymethylol phenols having a total combined formaldehyde content of between 2¼ and 3 mols per mol of phenol; adding a volatile compatible organic solvent, and an acid catalyst to said syrup to establish a pH of 5 to 6; azeotropically distilling solvent and water from said mass while adding sufficient solvent to the distilling mass to maintain its viscosity below about Z, and so continuing the azeotropic distillation and separation of water until the mass attains a viscosity between A and D, inclusive, when measured thereon at a non-volatile-matter level of between 31.6% and 34.6%, thereby converting said syrup into a bodied potentially heat-reactive film-forming material; and adding to the bodied material from 6% to 10% by weight thereof, of an acid accelerator.

4. A coating composition prepared in accordance with claim 3.

5. The method of preparing a bodied phenolic coating composition which without plasticization yields hard, flexible films, said method comprising the steps of: reacting in the proportions and order indicated (1) one mol of phenol with (2) from .05 to 1.0 mol of alkali metal base, and with (3) 2¼ to 3½ mols of formaldehyde, at a pH of at least 7 and at temperatures between about 68° F. and 100° F. for a period of from 5 to 7 days; acidifying said reaction mixture thereafter to establish a pH of about 6; inspissating the acidified mixture in vacuum at temperatures between about 90° F. and 120° F. until at least about 93% of its water content has been removed to provide a substantially dehydrated syrup; thereafter adding butanol to the syrup in the proportions of between about 135 and 270 parts by weight of butanol to 1000 parts of syrup; adding oxalic acid to the solution to establish a pH of between 5 and 6; heating the acidified solution and distilling water and butanol therefrom until a viscosity of about Z has been obtained; thereafter alternately adding butanol and distilling off water and butanol while maintaining the viscosity of the solution below about Z, until a total of about 810 parts of butanol have been added to the syrup and until the mass has attained a viscosity between A and D, inclusive, when measured at a non-volatile-material level of 31.6% to 34.6%; cooling and thinning the bodied solution with volatile solvent to obtain a viscosity suitable for application purposes, and incorporating in the thinned solution from about 6% to 10% of an acid accelerator.

6. A coating composition prepared in accordance with claim 5.

HYMAN SCHWARTZBERG.

References Cited in the file of this patent

UNITED STATES PATENTS

| Number | Name | Date |
|---|---|---|
| 1,985,453 | Luedeke | Dec. 25, 1934 |
| 2,091,183 | Murray et al. | Aug. 24, 1937 |
| 2,167,874 | Cordier et al. | Aug. 1, 1939 |
| 2,197,357 | Widmer | Apr. 16, 1940 |
| 2,307,742 | Herstein | Jan. 12, 1943 |